Patented May 1, 1934

1,956,793

UNITED STATES PATENT OFFICE 1,956,793

ASBESTOS ARTICLE AND METHOD OF FORMING THE SAME

Harry Gillett, Cleveland, Ohio, assignor to Detroit Steel Products Company, Detroit, Mich., a corporation of Michigan No Drawing. Application December 21, 1931, Serial No. 582,512

4 Claims. (Cl. 92—21)

The invention relates to asbestos articles and the method of forming the same and has for some of its objects to provide an improved asbestos article which is pliable and colored and to provide an improved economical method of forming such an article.

These and other objects of the invention will become apparent from the following description:

Heretofore attempts have been made to manufacture a pliable colored asbestos article or a colored asbestos felt by a process such as staining, but they have proven unsatisfactory owing to the fact that asbestos is a mineral fiber which is solid and has no capillarity and, as a result, the color disappeared by reason of being worn off by contact with other articles or by exposure. With my method the asbestos fibers, the pigment of the desired color in quantity sufficient to fill all voids in the felt and completely cover the fibers and a liquid binding material such as casein, oleo resinous products, or any other suitable binder are placed in a beater having revolving paddles where they are thoroughly mixed or commingled, after which this mixed material is formed into a single felt and preferably dried at the same time by suitable machinery, such as that used in the manufacture of paper. The mixed material forming the felt is preferably waterproofed by a suitable transparent waterproofing material which thoroughly impregnates the felt. This waterproofing may be accomplished in different ways and, as disclosed in the present instance, by passing the felt through a bath of transparent waterproofing material preferably having a paraffin base. More specifically, the felt is passed through a vat containing this waterproofing material at a sufficiently high temperature, such as approximately 400 to 500 degrees F., whereby the waterproofing material permeates the felt so that it is thoroughly impregnated and waterproofed. Then the felt may, if necessary, be coated with a transparent material, such as varnish or a cellulose product, rendering the felt impervious to air and such light rays as will cause fading in order that the coloring pigment may be protected from the action of the air and these light rays.

While the asbestos felt may be of different thicknesses, it is preferably formed to be not over $\frac{1}{32}$ of an inch thick and to weigh not more than eight pounds per square or 100 square feet. With the above method, the coloring pigment covers the asbestos fibers and is distributed throughout the felt and between the fibers and, since the felt is waterproofed and also air-sealed and light ray-sealed by transparent materials, the color of the felt is not affected by the waterproofing or air-sealing, but this color is effectively retained during the life of the felt.

What I claim as my invention is:

1. The method of forming a colored asbestos article, which comprises mixing asbestos fibers, coloring pigment and binding material, forming the mixed material into a felt, and then waterproofing the felt by impregnating the felt with a transparent waterproof material.

2. The method of forming a colored asbestos article, which comprises mixing asbestos fibers, coloring pigment and binding material, forming the mixed material into a felt, and waterproofing and then air-sealing the mixed material.

3. The method of forming a colored asbestos article, which comprises mixing asbestos fibers, coloring pigment and binding material, forming the mixed material into a felt, waterproofing the felt by impregnating the felt with a transparent waterproof material, and then air-sealing the felt by coating the same with a transparent material impervious to air.

4. A colored pliable asbestos article, which comprises asbestos fibers, binding material securing said fibers together, a coloring pigment carried by said fibers and binding material and covering and distributed between said fibers, transparent waterproofing material covering said coloring pigment and distributed between said fibers, and a transparent outer coat of material impervious to air.

HARRY GILLETT.